(12) United States Patent
Wilcox

(10) Patent No.: US 7,555,276 B2
(45) Date of Patent: Jun. 30, 2009

(54) DEVICES, METHODS, AND COMPUTER PROGRAM PRODUCTS FOR CONTROLLING POWER TRANSFER TO AN ANTENNA IN A WIRELESS MOBILE TERMINAL

(75) Inventor: Bruce Emerson Wilcox, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 525 days.

(21) Appl. No.: 11/311,732

(22) Filed: Dec. 19, 2005

(65) Prior Publication Data
US 2007/0142014 A1    Jun. 21, 2007

(51) Int. Cl.
*H04B 7/14* (2006.01)
*H04B 1/04* (2006.01)

(52) U.S. Cl. .................. 455/276.1; 455/24; 455/126

(58) Field of Classification Search .......... 455/522, 455/127.1, 127.2, 127.3, 24, 276.1, 126, 455/253, 517
See application file for complete search history.

(56) References Cited

U.S. PATENT DOCUMENTS

| | | | |
|---|---|---|---|
| 4,493,112 A | | 1/1985 | Bruene |
| 5,564,086 A | | 10/1996 | Cygan et al. |
| 6,288,606 B1 | * | 9/2001 | Ekman et al. .............. 330/51 |
| 6,424,232 B1 | | 7/2002 | Mavretic et al. |
| 6,621,367 B2 | * | 9/2003 | Suzuki et al. .............. 333/14 |
| 6,710,651 B2 | | 3/2004 | Forrester |
| 6,768,472 B2 | | 7/2004 | Alexopoulos et al. |
| 6,934,557 B2 | * | 8/2005 | Sekine et al. ............. 455/550.1 |
| 7,276,973 B2 | * | 10/2007 | Ripley et al. ............... 330/296 |
| 7,327,802 B2 | * | 2/2008 | Sanders et al. ............ 375/285 |
| 7,359,683 B2 | * | 4/2008 | Gilberton ............... 455/114.3 |

FOREIGN PATENT DOCUMENTS

| | | |
|---|---|---|
| EP | 1564896 A1 | 8/2005 |
| WO | WO 2005/050831 A1 * | 6/2005 |

OTHER PUBLICATIONS

Invitation to Pay Additional Fees and Partial International Search Report corresponding to PCT/US2006/032116 mailed on Jan. 2, 2007.

(Continued)

*Primary Examiner*—Sonny Trinh
(74) *Attorney, Agent, or Firm*—Myers Bigel Sibley & Sajovec, P.A.

(57) ABSTRACT

A wireless mobile terminal includes an antenna, a power amplifier coupled to the antenna, a power detector coupled to an output of the power amplifier, a phase shifter coupled between the output of the power amplifier and the antenna, and a controller coupled to the phase shifter. The power detector is configured to detect a power of a signal provided by the power amplifier. The controller is configured to adjust the phase shifter responsive to the detected signal power. More particularly, the controller may be configured to adjust the phase shifter to modify a phase component of a reflection coefficient of a load impedance at the power amplifier output without substantially altering a magnitude of the reflection coefficient. Related methods and computer program products are also discussed.

28 Claims, 7 Drawing Sheets

OTHER PUBLICATIONS

Notification of Transmittal of The International Search Report and The Written Opinion of the International Searching Authority, or the Declaration corresponding to PCT/US2006/032116 mailed on May 4, 2007.

Engen et al. "Thru-Reflect-Line: An Improved Technique for Calibrating the Dual Six-Port Automatic Network Analyzer", *IEEE Transactions Microwave Theory and Techniques* 27(12):987-993 (1979).

E. Brown "RF-MEMS Switches for Reconfigurable Integrated Circuits", *IEEE Transactions Microwave Theory and Techniques* 46(11):1868-1880 (1998).

* cited by examiner

DEVICES, METHODS, AND COMPUTER PROGRAM PRODUCTS FOR CONTROLLING POWER TRANSFER TO AN ANTENNA IN A WIRELESS MOBILE TERMINAL

FIELD OF THE INVENTION

The present invention relates to wireless communications, and, more particularly, to antenna performance in wireless mobile terminals.

BACKGROUND OF THE INVENTION

Wireless mobile terminals are widely used for voice, data and/or multimedia communications. As used herein, wireless mobile terminals may include conventional cell phones, Personal Communications Systems (PCS)/smart phones that may include data processing, voice, video, text message, e-mail and/or Web access capabilities, Personal digital Assistants (PDA) with wireless communications capabilities, wireless pagers, Blackberry wireless handheld e-mail devices, and/or laptop computers and/or other devices that may include a radiotelephone transceiver.

Wireless mobile terminals may be required to meet various standards promulgated by industry groups. One such standard is known as "conducted performance". The conducted performance standard may define performance requirements that a wireless mobile terminal must pass when terminated in a reference impedance of 50 ohms. As a power amplifier in a wireless mobile terminal is designed to operate into a given load impedance, a fixed RF matching network may be provided to optimize the power amplifier performance when the antenna port is terminated with 50 ohms.

However, when an actual antenna is installed, the power amplifier of the wireless mobile terminal may not be terminated with a 50 ohm impedance. An impedance mismatch between the antenna and the power amplifier may result in non-optimal power transfer to the antenna. More particularly, this may result in degraded amplifier output power ($P_{out}$) and Power Added Efficiency (PAE), which, in turn, may result in lower Total Radiated Power ($T_{rp}$) output. In other words, "over-the-air" (OTA) performance may be reduced, which may not satisfy user expectations.

An additional complication which may arise in wireless mobile terminals is that the antenna environment may be constantly changing, due to the changing proximity of the antenna to the head, hands, fingers, and/or other obstacles. This time-domain antenna environment variability translates into a time-domain antenna port impedance variance. As discussed above, such an impedance mismatch may cause power reflections at the point of connection that may result, for example, in reduced efficiency, bandwidth, and/or reduced signal-to-noise ratio.

As such, simultaneous optimization for both the conducted and OTA performance requirements may be difficult. Accordingly, as a compromise, fixed impedance matching networks have been used to trade-off some conducted performance for improved OTA performance. In addition, variable impedance matching networks have been utilized in wireless mobile terminals to match the impedance of the load in changing antenna environmental conditions.

However, due to the size constraints of modern wireless mobile terminals, it may be impractical to implement fixed and/or variable matching networks therein. Moreover, parasitic effects (due to undesired capacitance, inductance, and/or resistance) which may result from implementation of such matching networks may degrade antenna radiated efficiency and thereby compromise OTA performance, which may lead to user dissatisfaction.

SUMMARY OF THE INVENTION

According to some embodiments of the present invention, a wireless mobile terminal may include an antenna, a power amplifier coupled to the antenna, a power detector coupled to an output of the power amplifier, a phase shifter coupled between the output of the power amplifier and the antenna, and a controller coupled to the phase shifter. The power detector may be configured to detect a power of a signal provided by the power amplifier. The controller may be configured to adjust the phase shifter responsive to the detected signal power. For example, in some embodiments, the controller may be configured to adjust the phase shifter to modify a phase component of a reflection coefficient of a load impedance at the power amplifier output. More particularly, the controller may be configured to adjust the phase shifter to modify the phase component of the reflection coefficient without substantially altering a magnitude of the reflection coefficient. Accordingly, the phase shifter may be adjusted to provide at least some compensation for changing antenna environmental conditions.

In some embodiments, the controller may be configured to adjust the phase shifter during a communication responsive to changes in the detected signal power. In other embodiments, the controller may be configured to adjust the phase shifter in a calibration mode of operation.

In yet other embodiments, the phase shifter may be configured to provide a plurality of selectable phase shifts. For example, the phase shifter may be configured to provide the plurality of selectable phase shifts by adjusting a length of a signal transmission path therein. At least one of the plurality of selectable phase shifts may not substantially alter a phase component of a reflection coefficient of a load impedance at the power amplifier output. The controller may be configured to select from among the plurality of selectable phase shifts responsive to the detected signal power to adjust the phase shifter.

In some embodiments, the wireless mobile terminal may also include a matching network coupled between the power amplifier and the antenna. The matching network may be configured to provide a predetermined load impedance at the power amplifier output. For example, the matching network may be a fixed matching network that is configured to provide an impedance match between the power amplifier output and a 50 ohm load termination used, for instance, in conducted performance testing.

In other embodiments, the controller may be configured to store historical data for the phase shifter. The controller may further adjust the phase shifter based on the historical data.

In further embodiments, the detected signal power may be a present amplifier output power, and the controller may be configured to adjust the phase shifter based on a comparison between the present amplifier output power and an amplifier output power corresponding to a predetermined load impedance. For example, the controller may be configured to adjust the phase shifter if the present amplifier output power exceeds or falls below a desired signal power by a predetermined margin.

In other embodiments, the detected signal power may include a forward power component output from the power amplifier and a reflected or reverse power component that is reflected from the load. The controller may be configured to determine a present load impedance reflection coefficient based on the forward and reflected power components, and may be configured to adjust the phase shifter based on the present load impedance reflection coefficient.

In still other embodiments, the phase shifter may be a first phase shifter in a signal transmission path. The wireless mobile terminal may also include a second phase shifter in a signal reception path. The controller may be coupled to both the first and second phase shifters. The controller may be configured to determine a transmitter antenna port impedance based on the forward and reflected power components of the detected signal power, and may be configured to adjust the first phase shifter based on the transmitter antenna port impedance. In addition, the controller may be configured to determine a receiver antenna port impedance based on the transmitter antenna port impedance, and may be configured to adjust the second phase shifter based on the receiver antenna port impedance.

In some embodiments, the phase shifter may include a plurality of TRL (through, reflect, line) sections in a high dielectric constant medium. Each TRL section may have a different electrical length. The phase shifter may also include a plurality of switches coupled the plurality of TRL sections. The controller may be configured to activate ones of the plurality of switches to selectively enable ones of the plurality of TRL sections to adjust the phase shifter.

According to other embodiments of the present invention, a method of managing antenna output power in a wireless mobile terminal includes detecting a power of a signal provided by a power amplifier of the wireless mobile terminal, and adjusting a phase shifter coupled between the power amplifier and an antenna of the wireless mobile terminal responsive to the detected signal power. For example, in some embodiments, the phase shifter may be adjusted to modify a phase component of a reflection coefficient of a load impedance at an output of the power amplifier. More particularly, the phase shifter may be adjusted to modify the phase component of the reflection coefficient without substantially altering a magnitude of the reflection coefficient. As such, at least some compensation for changing antenna environmental conditions may be provided.

In some embodiments, the phase shifter may be adjusted during a communication responsive to changes in the detected signal power. In other embodiments, the phase shifter may be adjusted in a calibration mode of operation.

In yet other embodiments, the phase shifter may be adjusted by selecting one of a plurality of phase shifts provided by the phase shifter based on the detected signal power. More particularly, the length of a signal transmission path provided by the phase shifter may be adjusted to provide the plurality of phase shifts. For example, the length of the signal transmission path may be adjusted by selectively enabling one of a plurality of TRL sections having different electrical lengths provided by the phase shifter. In addition, at least one of the plurality of phase shifts may not substantially alter the phase component of the reflection coefficient.

In some embodiments, a predetermined load impedance may be provided at an output of the power amplifier using a matching network coupled between the antenna and the power amplifier. For example, an impedance match between the power amplifier output and a 50 ohm load termination may be provided by the matching network.

In other embodiments, historical data for the phase shifter may be stored. The phase shifter may be adjusted based on the stored historical data.

In some embodiments, the detected signal power may correspond to a present amplifier output power. The phase shifter may be adjusted based on a comparison between the present amplifier output power and an amplifier output power corresponding to a predetermined load impedance. For example, the phase shifter may be adjusted if the present amplifier output power exceeds or falls below a desired signal power by a predetermined margin.

In further embodiments, detecting the signal power may include detecting a forward power output from the power amplifier and a reflected power reflected from a load coupled thereto. A present load impedance reflection coefficient may be determined based on the forward power and the reflected power, and the phase shifter may be adjusted based on the present load impedance reflection coefficient.

In still other embodiments, the phase shifter may be a first phase shifter in a signal transmission path. A transmitter antenna port impedance may be determined based on the forward power and the reflected power, and a receiver antenna port impedance may be determined based on the transmitter antenna port impedance. The first phase shifter may be adjusted based on the transmitter antenna port impedance, and a second phase shifter in a signal reception path may be adjusted based on the receiver antenna port impedance.

According to still further embodiments of the present invention, a digital phase shifter may include a plurality of TRL (through, reflect, line) elements in a high dielectric constant medium, and a plurality of switches coupled the plurality of TRL elements. Each TRL element may have a different electrical length. The plurality of switches may be configured to selectively enable ones of the plurality of TRL elements to adjust an electrical length of a signal transmission path provided by the digital phase shifter, for example, responsive to a signal from a controller.

DETAILED DESCRIPTION OF EMBODIMENTS OF THE INVENTION

Figure 1:
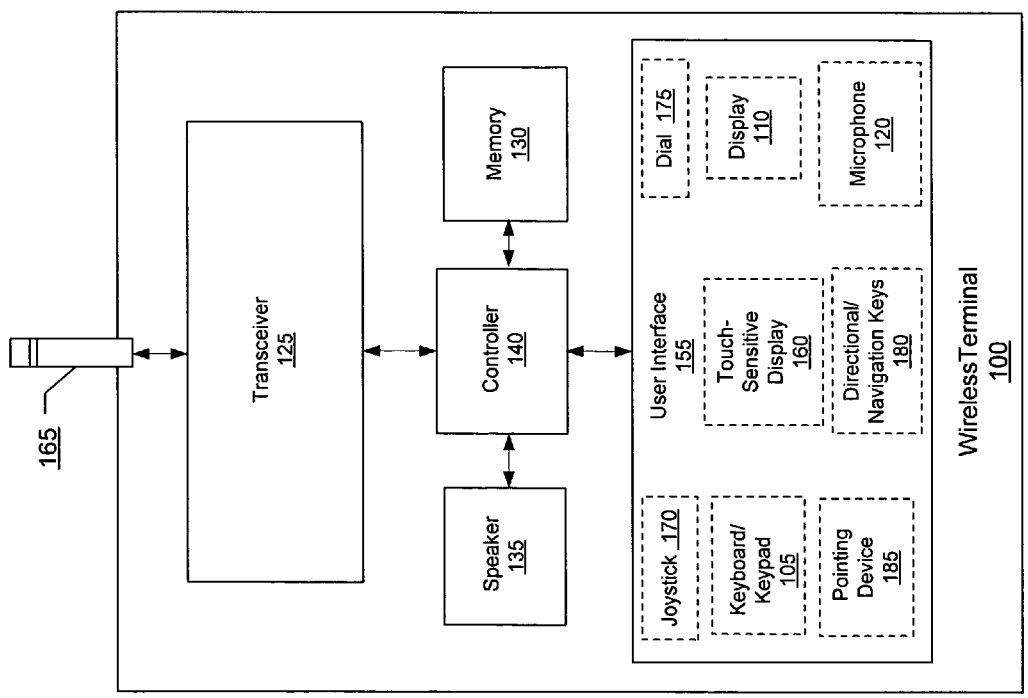
FIG. 1 is a block diagram illustrating wireless mobile terminals in accordance with some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

As will be appreciated by one of skill in the art, the present invention may be embodied as devices, methods, and computer program products. Accordingly, the present invention may be embodied in hardware and/or in software (including firmware, resident software, micro-code, etc.). Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

The present invention is described below with reference to flowchart illustrations and/or block and/or flow diagrams of methods according to embodiments of the invention. It should be noted that the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block and/or flow diagram block or blocks.

These computer program instructions may also be stored in a computer-readable memory that can direct a computer or other programmable processor to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processor to cause a series of operational steps to be performed on the computer or other programmable processor to produce a computer implemented process such that the instructions which execute on the computer or other programmable processor provide steps for implementing the functions or acts specified in the flowchart and/or block diagram block or blocks.

It should be understood, that, as used herein, the term "wireless communication device" or "wireless mobile terminal" may include, but is not limited to, a cellular radiotelephone; a pager; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop portable computer that includes a radiotelephone or other transceiver.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and/or the relevant art, and will not be interpreted in an idealized or overly formal sense unless expressly so defined herein.

Some embodiments of the present invention may arise from a realization that wireless mobile terminals may frequently be required to meet conflicting performance standards. For example, to meet "conducted performance" and/or other requirements proposed by various industry standards bodies, wireless mobile terminals may be evaluated when terminated in a specified impedance at the antenna port, for example, 50 ohms. However, in customer usage, the impedance at the antenna port may change over time based on the proximity of the antenna to various obstructions, such as the user's head, hands, etc. This may affect the device's radiated or over-the-air (OTA) performance, which may not meet customer expectations. Given the present four-band and five-band wireless mobile terminals, simultaneous optimization to meet both customer and industry requirements may be difficult. Moreover, although conventional active matching networks may be used to provide variable impedance matching, such networks may require a relatively large amount of physical space in wireless mobile terminals, which may not be available. Accordingly, some embodiments of the present invention employ a phase shifter to provide improved impedance matching in changing antenna environmental conditions. The phase shifter may require significantly less space than conventional matching networks, and as, such, may be more suitable and/or desirable for use in wireless mobile terminals.

FIG. 1 is a block diagram illustrating a wireless mobile terminal in accordance with some embodiments of the present invention. Referring now to FIG. 1, an exemplary wireless mobile terminal 100 includes a transceiver 125, memory 130, a speaker 135, a controller 140, and a user interface 155. The transceiver 125 typically includes a transmitter circuit and a receiver circuit which cooperate to transmit and receive radio signals to and from base station transceivers via an antenna 165. The radio frequency signals transmitted between the wireless mobile terminal and the base station transceivers may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, in some embodiments, the transceiver 125 may include an infrared (IR) transceiver configured to transmit/receive infrared signals to/from other electronic devices via an IR port.

The memory 130 may represent a hierarchy of memory that may include volatile and/or nonvolatile memory, such as removable flash, magnetic, and/or optical rewritable nonvolatile memory. The controller 140 is coupled to the transceiver 125, the memory 130, the speaker 135, and the user interface 155. The controller 140 may be, for example, a commercially available or custom microprocessor that is configured to coordinate and manage operations of the transceiver 125, the memory 130, the speaker 135, and/or the user interface 155.

As noted above, the wireless mobile terminal 100 also includes a user interface 155 coupled to the controller 140. The user interface 155 may include a microphone 120, a display 110 (such as a liquid crystal display), a joystick 170, a keyboard/keypad 105, a touch-sensitive display 160, a dial 175, directional/navigation keys 180, and/or a pointing device 185 (such as a mouse, track ball, touch pad, etc.). However, depending on functionalities offered by the wireless mobile terminal, additional and/or fewer elements of the user interface 155 may actually be provided. For instance, the touch-sensitive display 160 may be provided in a PDA that does not include a display 110, a keypad 105, and/or a pointing device 185.

The foregoing components of the wireless mobile terminal 100 of FIG. 1 may be included in many conventional wireless mobile terminals, and their functionality is generally known to those skilled in the art. In addition, in some embodiments, the functionalities of different blocks and/or portions of the wireless mobile terminal 100 may be combined, divided, and/or eliminated. For example, although the memory 130 is illustrated as separate from the controller 140, the memory 130 or portions thereof may be included as a part of the controller 140.

According to some embodiments of the present invention, the transceiver 125 may include a phase shifter. As used herein, a "phase shifter" may refer to any device and/or circuit that is configured to introduce an electrical delay into a network with negligible loss. For example, a phase shifter may be used to alter the transmission phase angle of a network. As such, the phase shifter may be employed in the wireless mobile terminal 100 to provide improved impedance matching between the transceiver 125 and the antenna 165. More particularly, the controller 140 may be configured to adjust the phase shifter to modify a load impedance seen by the transceiver 125 and/or components thereof.

Figure 2:
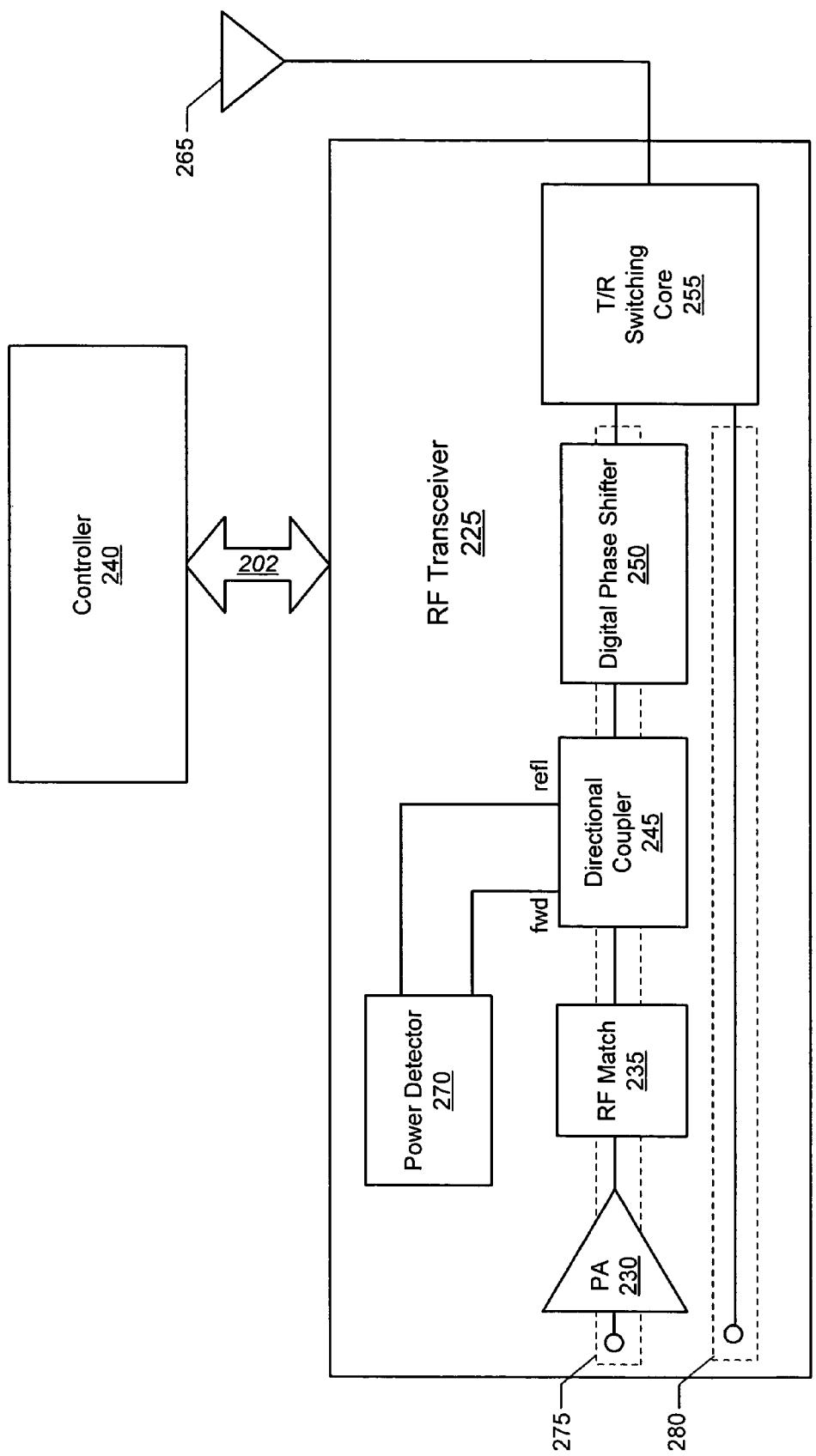
FIGS. 2 and 3 are block diagrams illustrating transceivers for use in wireless mobile terminals according to some embodiments of the present invention.
Figure 3:
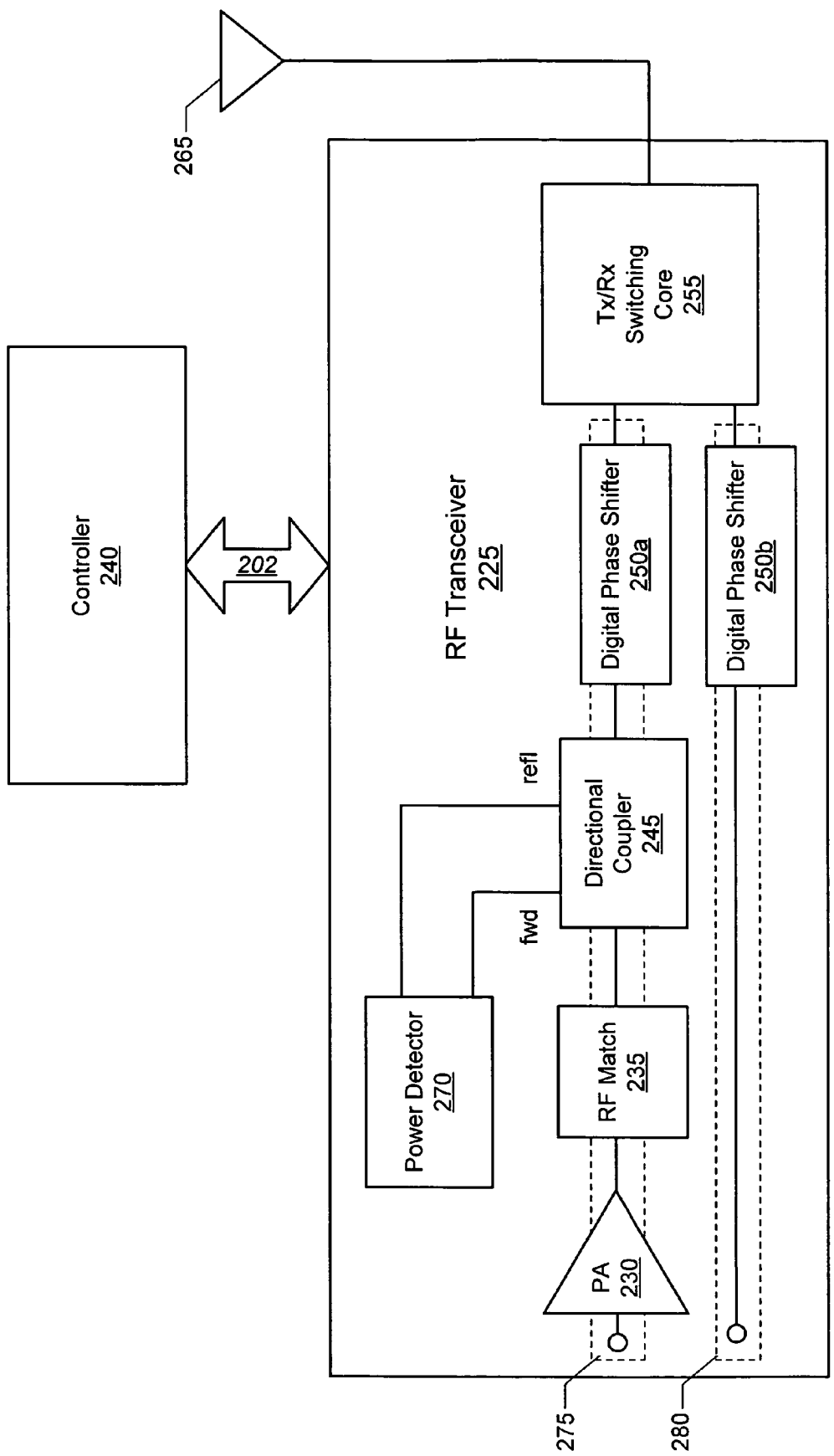

FIGS. 2 and 3 illustrate a transceiver architecture including a controller 240 and an RF transceiver 225 that may be used for managing antenna output power in a wireless mobile terminal, such as the wireless mobile terminal 100 of FIG. 1, according to some embodiments of the present invention. In some embodiments, the controller 240 and the RF transceiver 225 may respectively correspond to the controller 140 and the transceiver 125 of the wireless mobile terminal 100 of FIG. 1.

Referring now to FIG. 2, the RF transceiver 225 includes a power amplifier 230 coupled to an antenna 265. The RF transceiver 225 further includes an RF matching network 235, a directional coupler 245, a digital phase shifter 250, and a transmitter/receiver switching core 255 coupled between the power amplifier 230 and the antenna 265. The RF transceiver 225 includes a transmit path 275 including the foregoing components, and a receive path 280. The transmitter/receiver switching core 255 provides an interface between the antenna 265 and the transmit and receive paths 275 and 280. The RF matching network 235 may include electrical circuits and/or electrical components, such as inductors and/or capacitors, that are configured to "match" the output of the power amplifier 230 to a predetermined load impedance to thereby improve power transfer from the power amplifier 230 to the load. For example, the RF matching network 235 may be configured to provide a predetermined load impedance at the output of the power amplifier 230 to match the power amplifier output to a 50 ohm termination for use in conducted performance testing. The RF matching network 235 may be a fixed matching network or a variable matching network.

The directional coupler 245 is coupled to the output of the power amplifier 230. The directional coupler 245 is configured to separately sample the forward (incident) and/or the backward (reflected) power in the transmission path 275. As such, the directional coupler 245 provides an interface to measure the present signal power output from the power amplifier 230. More particularly, as shown in FIG. 2, a power detector 270 is coupled to the directional coupler 245, and may be configured to detect the power of a signal output from the power amplifier 230.

The digital phase shifter 250 may be a circuit and/or other electronic component and/or components that is configured to introduce an electrical delay into the transmission path 275 with negligible insertion loss. More particularly, the digital phase shifter 250 may be configured to provide a plurality of selectable phase shifts. As such, as will be described in detail below, the digital phase shifter 250 may be adjusted to improve impedance matching between the output of the power amplifier 230 and the antenna 265 over changing antenna environmental conditions.

Still referring to FIG. 2, the power amplifier 230, the transmitter/receiver switching core 255, and the digital phase shifter 250 may be operated responsive to signals received from the controller 240, for instance, via a bus 202 between the controller 240 and the RF transceiver 225. For example, based on the signal power detected by the power detector 270, the controller 240 may be configured to adjust the digital phase shifter 250 to modify a phase component of a reflection coefficient of the load impedance seen at the output of the power amplifier 230. As used herein, the "reflection coefficient" is a ratio of a reverse (reflected) power component that is reflected from a load to a forward (incident) power component that is output from a source, such as the power amplifier 230, due to an impedance mismatch therebetween. More specifically, the controller 240 may be configured to select from among the plurality of selectable phase shifts provided by the digital phase shifter 250 to modulate the phase component of the reflection coefficient without substantially altering a magnitude of the reflection coefficient. In other words, the digital phase shifter 250 may be utilized to rotate the power amplifier output termination reflection coefficient locus around a constant reflection coefficient circle. As such, the digital phase shifter 250 may not provide an exact impedance match between the antenna 265 and the power amplifier 230. Rather, the controller 240 adjusts the digital phase shifter 250 to rotate the power amplifier output port termination to a more favorable (for OTA performance) impedance. This may provide a closer (but not ideal) impedance match between the output of the power amplifier 230 and the antenna 265 for improved power transfer therebetween.

The controller 240 may be configured to adjust the digital phase shifter 250 during a communication responsive to changes in the detected signal power from the power detector 270 to at least partially compensate for changes in antenna impedance due to changing environmental conditions. In other words, the phase shifter 250 may be adjusted while the wireless terminal is transmitting and/or receiving wireless signals, for instance, in real-time. For example, the power detector 270 may be configured to detect a current or present amplifier output power from the power amplifier 230. The controller 240 may be configured to adjust the phase shifter 250 based on a comparison between the present amplifier output power detected by the power detector 270 and an amplifier output power corresponding to a predetermined load impedance, such as the 50 ohm load impedance used in conducted performance testing. More particularly, the controller 240 may be configured to adjust the phase shifter 250 if the present amplifier output power exceeds or falls below the 50 ohm amplifier output power by a predetermined margin.

In addition, the power detector 270 may be configured to detect a forward power component output from the power amplifier 230 and a reflected power component from the load. The controller 240 may be configured to determine a present load impedance reflection coefficient based on the forward and reflected power components, and may be configured to adjust the phase shifter 250 based on the present load impedance reflection coefficient. Also, the RF transceiver 225 may include a calibration mode of operation, and the controller 240 may be configured to adjust the phase shifter 250 in the calibration mode of operation.

The controller 240 may also include intelligence to prevent degradation in OTA performance when the phase shifter 250 is adjusted. In other words, the controller 240 may be configured to avoid identified undesirable phase shifts when adjusting the phase shifter 250. For example, during wireless mobile terminal development, the controller 240 may be programmed to avoid particular phase shift regions. In addition, the controller 240 may avoid selecting undesirable phase shifts more than once based on stored history data for the phase shifter 250.

Although the digital phase shifter 250 may not provide an exact impedance match between the output of the power amplifier 230 and the antenna 265, as may be possible with a variable matching network, the digital phase shifter 250 may require substantially less physical space in a wireless mobile terminal. This may be advantageous as wireless mobile terminals are reduced in size. Moreover, from a practical viewpoint, modulation of the phase component of the load reflection coefficient may be of equal and/or greater importance in improving and/or optimizing antenna output power than modulating both the reflection coefficient magnitude and phase components.

In addition, the digital phase shifter 250 may include a phase shift setting that does not substantially alter a phase component of the reflection coefficient. In other words, one of the phase shift settings provided by the digital phase shifter 250 may be configured to appear as an ideal "thru" device. As used herein, an ideal "thru" device may be represented as a negligible loss/linear transmission path. Such a phase shift setting may be employed in conducted performance testing for impedance matching to the 50 ohm load termination, so that minimal conducted performance degradation may result. This may represent a significant advantage over the use of conventional fixed and/or variable matching networks in wireless mobile terminals, where parasitic effects (such as undesired capacitance, inductance, resistance) may be present. As a result, a matching network optimized for conducted performance testing may not approach the quality of the "thru" setting provided by the digital phase shifter 250. Accordingly, the digital phase shifter 250 may be employed to simultaneously meet both the conducted performance requirements set forth by industry standards as well as the over the air (OTA) performance requirements demanded by customers.

FIG. 3 is a block diagram illustrating a transceiver architecture according to further embodiments of the present invention. As illustrated in FIG. 3, in addition to the power amplifier 230, the RF matching network 235, the directional coupler 245, and the digital phase shifter 250a included in the transmit path 275, the RF transceiver 225 includes a digital phase shifter 250b in the receive path 280. The power detector 270 in the transmit path 275 is configured to detect both forward and reflected power components over the transmit path 275, and the controller 240 is configured to determine a transmitter antenna port impedance based on the forward and reflected power components. More particularly, the controller 240 may determine the transmitter antenna port impedance reflection coefficient based on the forward and reflected power components, and may determine the transmitter antenna port impedance based on the reflection coefficient.

The controller 240 may then determine a corresponding receiver antenna port impedance based on the determined transmitter antenna port impedance. For example, the receiver antenna port impedance may be determined based on the transmitter antenna port impedance and the relative (known) impedance relationship of the transmit and receive paths 275 and 280. As such, the controller 240 may adjust the phase shifter 250a based on the determined transmitter antenna port impedance, and may adjust the phase shifter 250b based on the determined receiver antenna port impedance. Thus, both transmitter and receiver mode OTA performance may be improved. More specifically, total radiated power ($T_{rp}$), which is a measure of transmitter performance, and total isotropic sensitivity ($T_{is}$), which is a measure of receiver performance, may be improved.

Although FIGS. 2 and 3 illustrate exemplary transceiver architectures that may be used to manage antenna output power in a wireless mobile terminal, it will be understood that the present invention is not limited to such configurations but is intended to encompass any configuration capable of carrying out the operations described herein. For example, the architectures illustrated in FIGS. 2 and/or 3 may be employed in a single frequency band. As such, wireless mobile terminals that operate over multiple frequency bands may include multiple digital phase shifters, one for each band. For instance, in quad-band GSM wireless mobile terminals that are designed to operate in the 850/9001800/1900 MHz frequency bands, a power amplifier, an RF matching network, a directional coupler, and a digital phase shifter may be respectively provided for each frequency band. Moreover, although a single antenna 265 is illustrated in FIGS. 2 and 3, multiple antennas may be included to provide such multi-band capabilities. In addition, the RF transceiver architectures of FIGS. 2 and 3 may support a variety of cellular communication protocols such as, for example, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Also, while particular functionalities are shown in particular blocks by way of illustration, functionalities of different blocks and/or portions thereof may be combined, divided, and/or eliminated. For example, although the digital phase shifter 250 and the power amplifier 230 are illustrated as separate components in FIG. 2, the digital phase shifter 250 may be integrated and/or otherwise included in the power amplifier 230.

Figure 4:
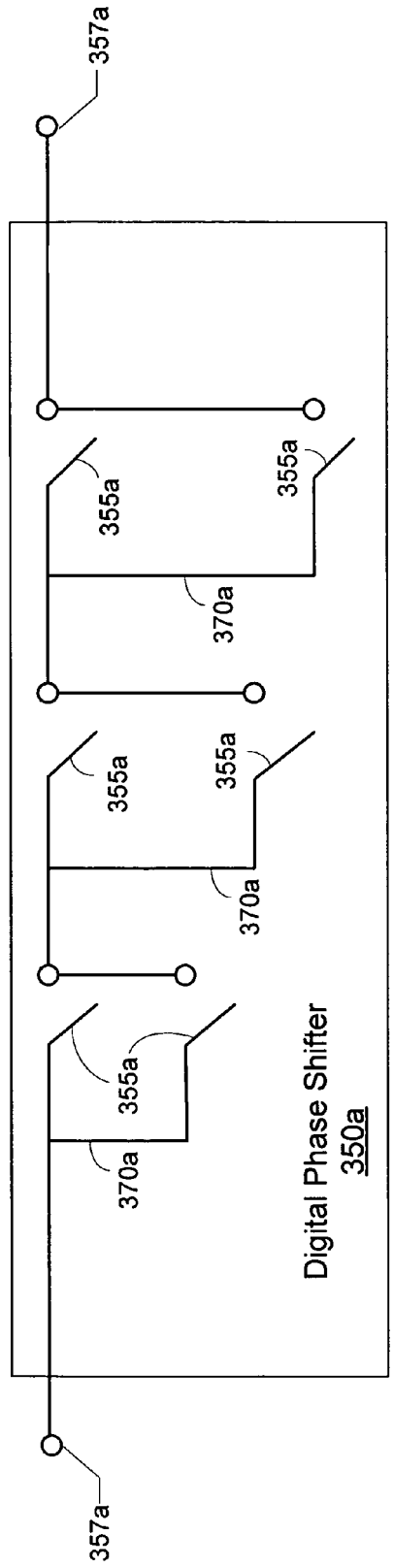
FIGS. 4 and 5 are block diagrams illustrating digital phase shifters according to some embodiments of the present invention.
Figure 5:
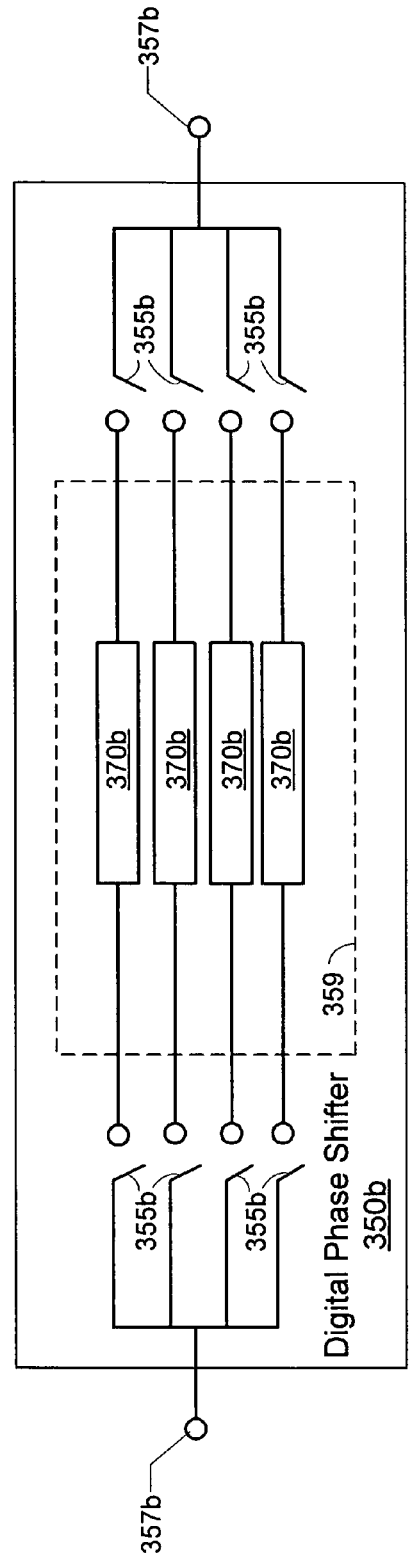

FIGS. 4 and 5 illustrate exemplary digital phase shifters according to some embodiments of the present invention. The digital phase shifters 350a and 350b illustrated in FIGS. 4 and 5 may correspond, for example, to any of the digital phase shifters 250, 250a, and/or 250b of the RF transceiver 225 illustrated in FIGS. 2 and 3.

Referring now to FIG. 4, the digital phase shifter 350a includes a plurality of wire line loops 370a coupled between input/output ports 357a by a plurality of independently operable switches 355a. More particularly, the digital phase shifter 350a illustrated in FIG. 4 is a time delay phase shifter in which N (in this case, three) different binary loops 370a are connected in series to provide $2^N$ (e.g., eight) possible electrical delays between the input/output ports 357a by independently activating ones of the switches 355a. In other words, the digital phase shifter 350a may be configured to provide eight different selectable phase shifts (for example, of 45 degrees each). Accordingly, a controller, such as the controller 240 of FIGS. 2 and 3, may selectively activate ones of the switches 355a to adjust the length of the signal transmission path between input/output ports 357a.

FIG. 5 is a block diagram illustrating a digital phase shifter 350b according to further embodiments of the present invention. Referring now to FIG. 5, the digital phase shifter 350b includes N TRL (through, reflect, line) sections 370b connected between input output ports 357b by a plurality of switches 355b. The TRL sections may include a through line (for example, a uniform 50 ohm microstrip line), a reflect line (such as an open or short circuited microstrip line), and a line of slightly longer length than the through line (for example, longer by less than one-half wavelength). Each TRL section 370b may have a different electrical length. As such, by selectively activating ones of the switches 355b, ones of the TRL sections 370b may be selectively enabled to adjust an electrical length of the signal transmission path between the input/output ports 375b. Thus, the digital phase shifter 350b may provide a plurality of selectable phase shifts. More particularly, as shown in FIG. 5, four TRL sections 370b are included in the digital phase shifter 350b, thereby providing four selectable phase shifts. A controller, such as the controller 240 of FIGS. 2 and 3, may be configured to activate ones of the switches 355b to selectively enable ones of the TRL sections 370b to adjust the phase shifter 350b. Although illustrated in FIG. 5 with reference to four TRL sections 370b, fewer or more TRL sections may be provided based on the desired degree of adjustability for the phase shifter 350b. In addition, one of the TRL sections 370b may be configured such that it does not substantially alter a phase component of a reflection coefficient of a load impedance when selected. Such a TRL section may be used for compliance in conducted performance testing, to avoid altering an impedance match between a power amplifier output of a transceiver and the 50 ohm load termination used therein.

Still referring to FIG. 5, the switches 355b may include PIN diodes, GaAs transistors, RF-CMOS transistors, MEMS, and/or other switch types. Moreover, the TRL sections 370b may be provided in a medium 359 having a relatively high dielectric constant (k), such as a low temperature co-fired ceramic (LTCC) substrate and/or an organic substrate. The use of such a high-k medium may allow the digital phase shifter 350b to have a relatively small size, which may be advantageous for use in wireless mobile terminals.

Although FIGS. 4 and 5 illustrate exemplary digital phase shifters, it is to be understood that embodiments of the present invention may employ any of a variety of digital phase shifters. For example, other methods for providing time delay phase shifting while reducing a circuit area and improving phase accuracy are described in "RF-MEMS Switches for Reconfigurable Integrated Circuits" by Elliot R. Brown, *IEEE Transactions on Microwave Theory and Techniques*, Vol. 46, Number 11, November 1998. Such methods for achieving time delay phase shifting may involve the use of a coplanar wave guide transmission line that is periodically loaded with MEMS switches. Each switch may be fabricated in a parallel configuration directly across the line in such a way that a variation in the gap of the parallel switches may change the capacitance, and hence, the phase shift and electrical time delay down the line. More generally, while particular embodiments of digital phase shifters have been shown and described with reference to FIGS. 4 and 5, embodiments of the present invention are not limited to the particular digital phase shifters described herein.

Figure 6:
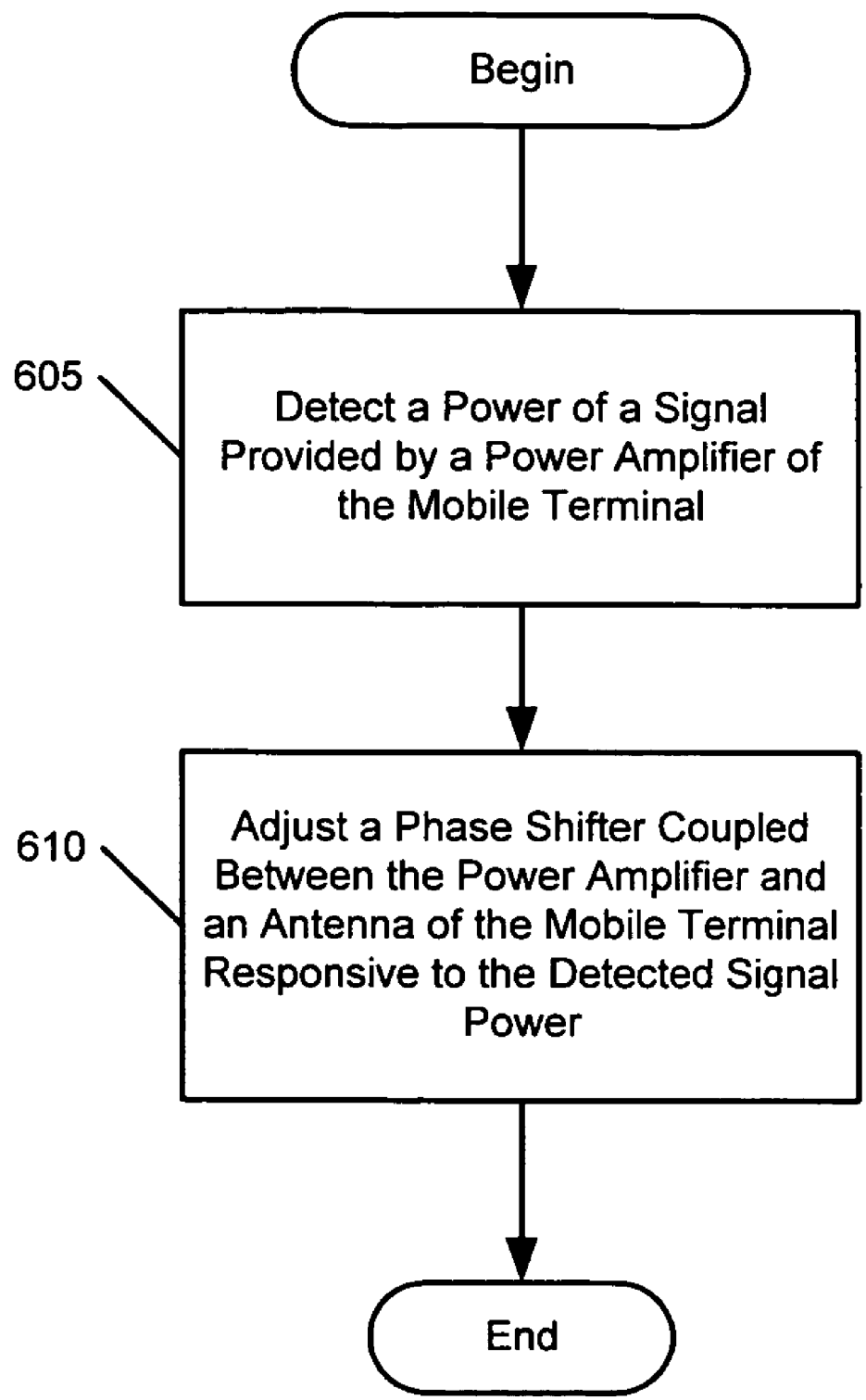
FIGS. 6 to 8 are flowcharts illustrating operations for managing antenna output power in wireless mobile terminals according to some embodiments of the present invention.
Figure 7:
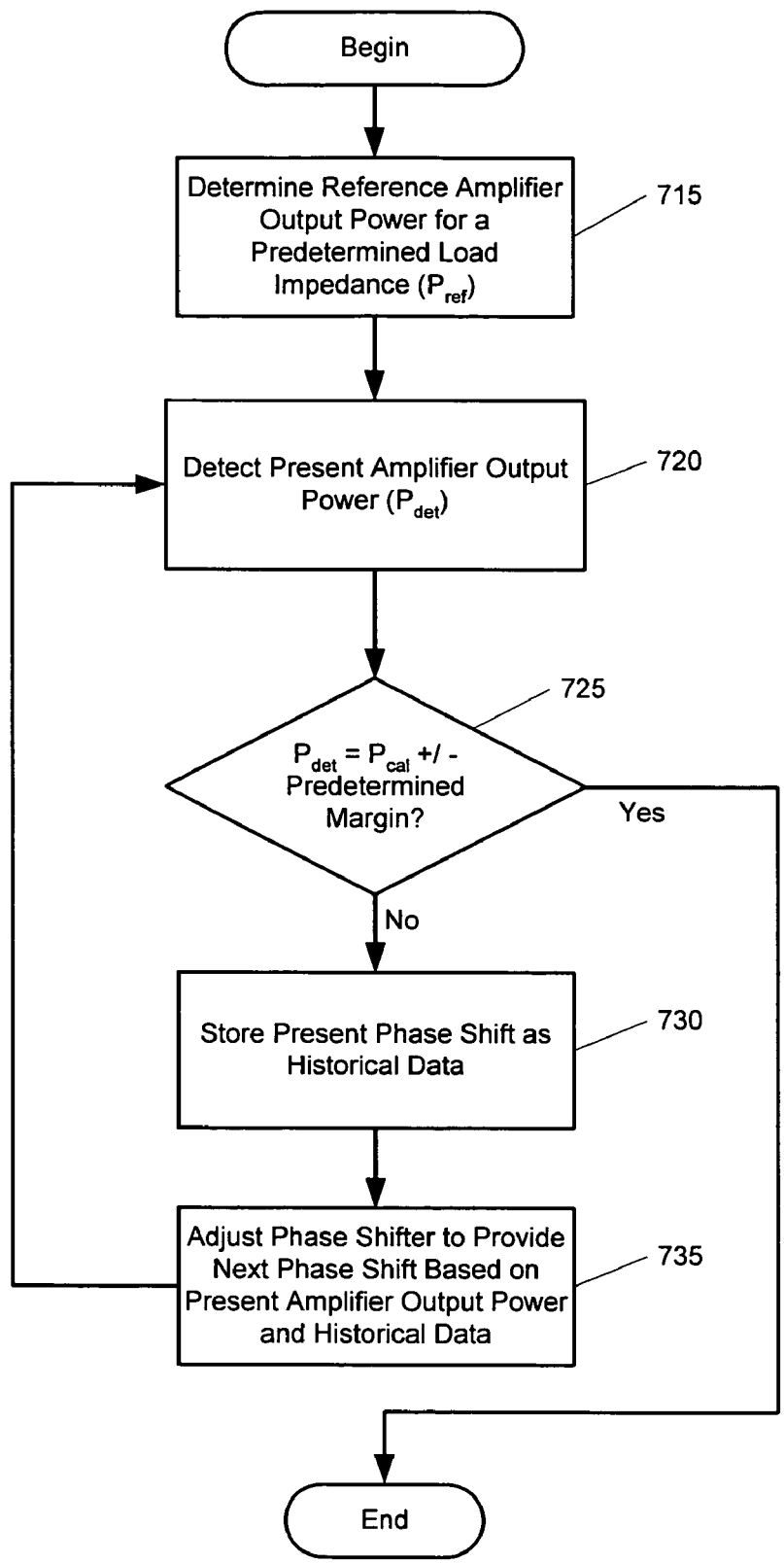
Figure 8:
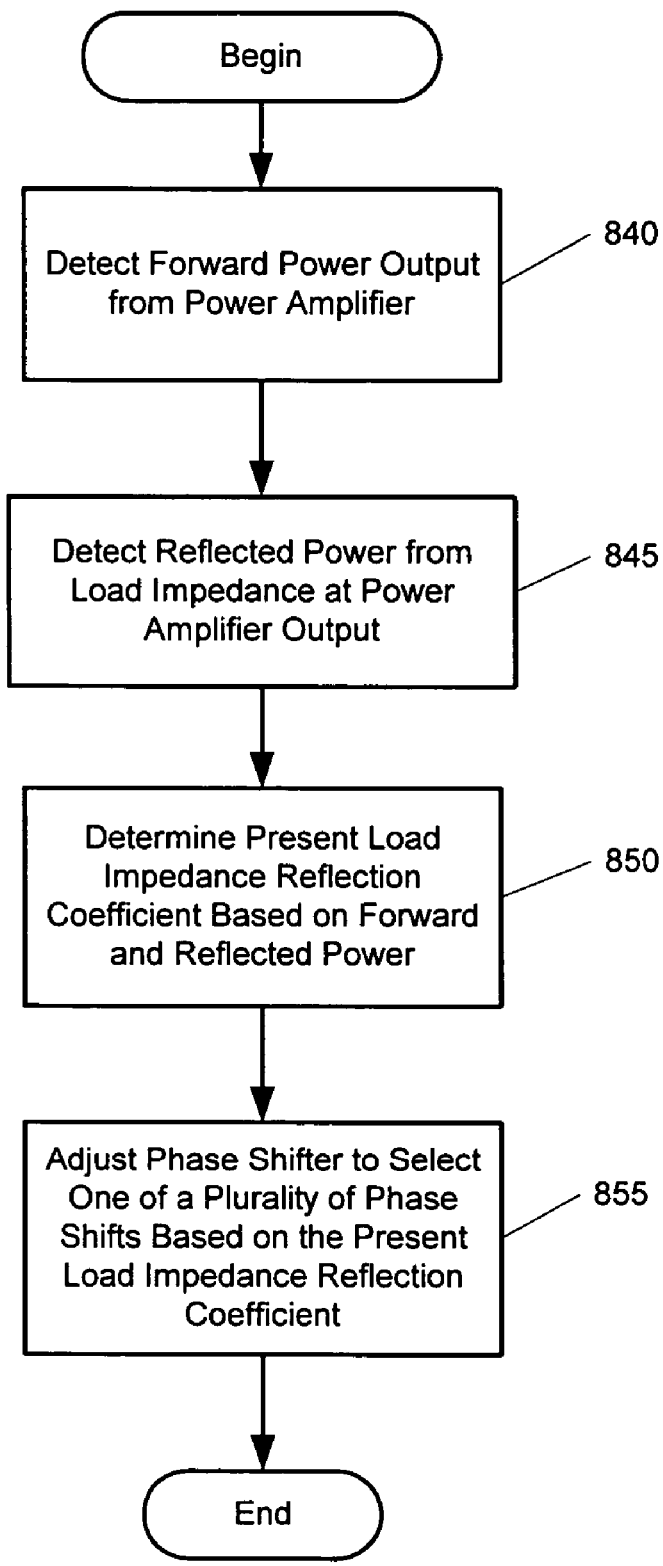

FIGS. 6 to 8 are flowcharts illustrating operations for managing antenna output power in a wireless mobile terminals according to some embodiments of the present invention.

Referring now to FIG. 6, operations for managing antenna output begin at block 605 when a power of a signal provided by a power amplifier of the wireless mobile terminal is detected. For example, the signal power may be detected by a power detector, such as the power detector 270 of FIGS. 2 and 3. Responsive to the detected signal power, a phase shifter coupled between the power amplifier and an antenna of the wireless mobile terminal, such as the digital phase shifter 250, is adjusted at block 610. The phase shifter may be adjusted to modify a phase component of the reflection coefficient of the load impedance at the output of the power amplifier. More specifically, the phase shifter may be adjusted to modify the phase component of the reflection coefficient without substantially altering a magnitude of the reflection coefficient, which may provide improved power transfer between the power amplifier output and the load impedance. The phase shifter may be adjusted during a communication responsive to changes in the detected signal power to compensate for changes in the load impedance, for example, due to changing antenna environmental conditions, thereby improving OTA performance. Because the phase shifter is adjusted to modulate only the phase component of the load reflection coefficient, an exact impedance match is not provided. However, the phase shifter may require substantially less physical space than a conventional matching network, which may be advantageous in a wireless mobile terminal.

Additional operations for managing antenna output power in wireless mobile terminals according to some embodiments of the present invention will now be described with reference to FIG. 7. As shown in FIG. 7, operations begin at block 715 when a reference amplifier output power ($P_{ref}$) is determined for a predetermined load impedance at the output of a power amplifier of a wireless mobile terminal, such as the power amplifier 230 of FIGS. 2 and 3. For example, the reference output power may be determined where an antenna port of the wireless mobile terminal is terminated in a 50 ohm load impedance for conducted performance testing. A present amplifier output power ($P_{det}$) is determined at block 720. For example, a power detector coupled to the output of the power amplifier, such as the power detector 270, may be used to detect the present amplifier output power. A phase shifter, such as the digital phase shifter 250 of FIG. 2, may be adjusted based on a comparison between the present amplifier output power and the reference amplifier output power. More specifically, at block 725, it is determined whether the present amplifier output power exceeds or falls below the reference output power for the predetermined load impedance (or other desired signal power) by a predetermined margin. If the present amplifier output power is within the predetermined margin, operations may end. Alternatively, if the amplifier output power is within the predetermined margin, operations may return to block 720 to detect a new present amplifier output power.

Still referring to FIG. 7, if it is determined that the present amplifier output power exceeds and/or falls outside of the predetermined margin at block 725, the present phase shift is stored as historical data, for example, in a history buffer, at block 730. The history buffer may include undesirable phase shift values, for instance, based on prior adjustments to the phase shifter. In addition, one or more phase shifts provided by the phase shifter may not substantially alter the phase component of a reflection coefficient, for example, for use in conducted performance testing. As such, the history buffer may also include this information. Based on the stored historical data and on the present amplifier output power, the phase shifter is adjusted to modify a phase component of the reflection coefficient of the present load impedance at the output of the power amplifier at block 735. For example, a next phase shift may be selected based on undesirable phase shift information stored in the history buffer, and the phase shifter may provide the next phase shift by selectively enabling ones of a plurality of TRL sections having different electrical lengths to thereby adjust the length of a signal transmission path through the phase shifter. Operations then return to block 720, where a new present amplifier output power is detected based on the adjustments to the phase shifter, and the above operations are repeated. As such, an iterative process is provided that continually adjusts the phase shifter to maintain the present amplifier output power within a predetermined margin of a desired amplifier output power.

Still further operations for managing antenna output power in wireless mobile terminals according to some embodiments of the present invention will now be described with reference to FIG. 8. As shown in FIG. 8, operations begin when a forward power that is output from a power amplifier is detected at block 840. A reflected or reverse power that is reflected from a load impedance at the power amplifier output is detected at block 845. For example, a directional coupler, such as the directional coupler 245 of FIGS. 2 and 3, may be coupled to the power amplifier output to separate the forward and reflected power, and a power detector, such as the power detector 270, may be used to detect the forward and reflected power. Based on the forward power and the reflected power, a present load impedance reflection coefficient is determined at block 850. The load impedance reflection coefficient may be based on a ratio of the reverse (reflected) power to the forward (incident) power. In some embodiments, a transmitter antenna port impedance may be determined based on the load impedance reflection coefficient, and a receiver antenna port impedance may be determined based on the transmitter antenna port impedance, as described above with reference to FIG. 3.

Still referring to FIG. 8, a phase shifter, such as the digital phase shifter 250 of FIG. 2, may be adjusted to select one of a plurality of phase shifts, for example, by adjusting the length of a signal transmission path therein, at block 855. The digital phase shifter may be adjusted based on the present load impedance reflection coefficient determined at block 850 to rotate the power amplifier output port termination to a more favorable impedance for OTA performance. As such, operations according to the embodiments of FIG. 8 may not rely purely on iteration to determine an improved and/or optimal phase shifter setting, although the operations of FIG. 8 may be periodically repeated to compensate for changing antenna environmental conditions. Also, where a phase shifter is included in each of the transmit and receive paths of a transceiver, the transmit phase shifter may be adjusted based on the transmitter antenna port impedance, and the receiver phase shifter may be adjusted based on the receiver antenna port impedance. In other words, based on the determined transmitter antenna port impedance, receiver OTA optimization may be possible using the receiver phase shifter. A receiver quality measurement on the "downlink" communication path may be used to validate and/or verify the adjustments to the receiver path phase shifter.

Thus, according to some embodiments of the present invention, a phase shifter in a wireless mobile terminal transceiver is adjusted based on a detected signal power output from a power amplifier of the wireless mobile terminal to improve power transfer between the power amplifier and the wireless mobile terminal antenna. More particularly, a phase component of the reflection coefficient of the load impedance at the power amplifier output may be modified to improve impedance matching between the power amplifier output and the load. The phase shifter may be adjusted during a communication, so that OTA performance may be continuously improved and/or optimized for varying antenna environmental conditions while the wireless terminal is in-use. Although such a phase adjustment may not provide an exact impedance match, the phase shifter may require substantially less space in the wireless mobile terminal than a conventional matching network, which may be important as wireless mobile terminals are reduced in size. Accordingly, both industry and customer performance requirements may be satisfied, which may result in quicker development schedules and better overall OTA performance.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. A wireless mobile terminal, comprising:
   an antenna;
   a power amplifier coupled to the antenna;
   a power detector coupled to an output of the power amplifier and configured to detect a signal power at the output of the power amplifier;
   a phase shifter coupled between the output of the power amplifier and the antenna; and
   a controller coupled to the phase shifter,
   wherein the controller is configured to adjust the phase shifter responsive to the detected signal power to modify a phase component of a reflection coefficient of a load impedance at the power amplifier output.

2. The wireless mobile terminal of claim 1, wherein the controller is configured to adjust the phase shifter to modify the phase component of the reflection coefficient without substantially altering a magnitude thereof.

3. The wireless mobile terminal of claim 1, further comprising:
   a matching network coupled between the power amplifier and the antenna,
   wherein the matching network is configured to provide a predetermined load impedance at the power amplifier output.

4. The wireless mobile terminal of claim 3, wherein the matching network comprises a fixed matching network.

5. The wireless mobile terminal of claim 1, wherein the controller is configured to store historical data for the phase shifter and adjust the phase shifter based on the historical data.

6. The wireless mobile terminal of claim 1, wherein the controller is configured to adjust the phase shifter during a communication responsive to changes in the detected signal power.

7. A wireless mobile terminal, comprising:
   an antenna;
   a power amplifier coupled to the antenna;

a power detector coupled to an output of the power amplifier and configured to detect a signal power at the output of the power amplifier;

a phase shifter coupled between the output of the power amplifier and the antenna; and a controller coupled to the phase shifter, wherein the controller is configured to adjust the phase shifter responsive to the detected signal power, wherein the phase shifter is configured to provide a plurality of selectable phase shifts, and wherein the controller is configured to select from among the plurality of selectable phase shifts responsive to the detected signal power to adjust the phase shifter.

8. The wireless mobile terminal of claim 7, wherein the phase shifter is configured to provide the plurality of selectable phase shifts by adjusting a length of a signal transmission path therein.

9. The wireless mobile terminal of claim 7, wherein one of the plurality of selectable phase shifts does not substantially alter a phase component of a reflection coefficient of a load impedance at the power amplifier output.

10. A wireless mobile terminal, comprising:
an antenna;
a power amplifier coupled to the antenna;
a power detector coupled to an output of the power amplifier and configured to detect a signal power at the output of the power amplifier;
a phase shifter coupled between the output of the power amplifier and the antenna; and
a controller coupled to the phase shifter, wherein the controller is configured to adjust the phase shifter responsive to the detected signal power,
wherein the detected signal power comprises a present amplifier output power, and wherein the controller is configured to adjust the phase shifter based on a comparison between the present amplifier output power and a reference amplifier output power corresponding to a predetermined load impedance.

11. The wireless mobile terminal of claim 10, wherein the controller is configured to adjust the phase shifter if the present amplifier output power exceeds or falls below a desired signal power by a predetermined margin.

12. A wireless mobile terminal, comprising:
an antenna;
a power amplifier coupled to the antenna;
a power detector coupled to an output of the power amplifier and configured to detect a signal power at the output of the power amplifier;
a phase shifter coupled between the output of the power amplifier and the antenna; and
a controller coupled to the phase shifter, wherein the controller is configured to adjust the phase shifter responsive to the detected signal power,
wherein the detected signal power comprises a forward power component output from the power amplifier and a reflected power component, and wherein the controller is configured to determine a present load impedance reflection coefficient based on the forward and reflected power components and adjust the phase shifter based on the present load impedance reflection coefficient.

13. The wireless mobile terminal of claim 12, wherein the phase shifter comprises a first phase shifter in a signal transmission path, wherein the controller is configured to determine a transmitter antenna port impedance based on the forward and reflected power components, and further comprising:
a second phase shifter in a signal reception path, wherein the controller is coupled to the second phase shifter and is configured to determine a receiver antenna port impedance based on the transmitter antenna port impedance and adjust the second phase shifter based on the receiver antenna port impedance.

14. A wireless mobile terminal, comprising:
an antenna;
a power amplifier coupled to the antenna;
a power detector coupled to an output of the power amplifier and configured to detect a signal power at the output of the power amplifier;
a phase shifter coupled between the output of the power amplifier and the antenna, wherein the phase shifter comprises:
a plurality of TRL (through, reflect, line) sections in a high dielectric constant medium, each TRL section having a different electrical length; and
a plurality of switches coupled the plurality of TRL sections; and
a controller coupled to the phase shifter, wherein the controller is configured to activate ones of the plurality of switches to selectively enable ones of the plurality of TRL sections to adjust the phase shifter responsive to the detected signal power.

15. A method of controlling power transfer to an antenna in a wireless mobile terminal, the method comprising:
detecting a power of a signal at an output of a power amplifier of the wireless mobile terminal; and
adjusting a phase shifter coupled between the power amplifier and an antenna of the wireless mobile terminal responsive to the detected signal power to modify a phase component of a reflection coefficient of a load impedance at the output of the power amplifier.

16. The method of claim 15, wherein adjusting the phase shifter further comprises:
adjusting the phase shifter to modify the phase component of the reflection coefficient without substantially altering a magnitude thereof.

17. The method of claim 15, further comprising:
providing a predetermined load impedance at an output of the power amplifier using a matching network coupled between the antenna and the power amplifier.

18. The method of claim 15, further comprising:
storing historical data for the phase shifter,
wherein adjusting the phase shifter further comprises adjusting the phase shifter based on the stored historical data.

19. The method of claim 15, wherein adjusting the phase shifter further comprises:
adjusting the phase shifter during a communication responsive to changes in the detected signal power.

20. A computer program product for controlling power transfer to an antenna in a wireless mobile terminal, the computer program product comprising:
a computer readable storage medium having computer readable program code embodied therein that, when executed by a processor, is configured to carry out the method of claim 15.

21. A method of controlling power transfer to an antenna in a wireless mobile terminal, the method comprising:
detecting a power of a signal at an output of a power amplifier of the wireless mobile terminal; and
adjusting a phase shifter coupled between the power amplifier and an antenna of the wireless mobile terminal responsive to the detected signal power by selecting one of a plurality of phase shifts provided by the phase shifter based on the detected signal power.

22. The method of claim 21, wherein selecting one of the plurality of phase shifts comprises:

adjusting the length of a signal transmission path provided by the phase shifter based on the detected signal power.

23. The method of claim 22, wherein adjusting the length of the signal transmission path comprises:

selectively enabling one of a plurality of TRL (through, reflect, line) sections having different electrical lengths provided by the phase shifter.

24. The method of claim 21, wherein one of the plurality of phase shifts does not substantially alter the phase component of the reflection coefficient.

25. A method of controlling power transfer to an antenna in a wireless mobile terminal, the method comprising:

detecting a power of a signal at an output of a power amplifier of the wireless mobile terminal; and adjusting a phase shifter coupled between the power amplifier and an antenna of the wireless mobile terminal responsive to the detected signal power, wherein the detected signal power corresponds to a present amplifier output power, and wherein adjusting the phase shifter comprises adjusting the phase shifter based on a comparison between the present amplifier output power and a reference amplifier output power corresponding to a predetermined load impedance.

26. The method of claim 25, wherein adjusting the phase shifter further comprises:

adjusting the phase shifter if the present amplifier output power exceeds or falls below a desired signal power by a predetermined margin.

27. A method of controlling power transfer to an antenna in a wireless mobile terminal, the method comprising:

detecting a power of a signal at an output of a power amplifier of the wireless mobile terminal by:

detecting a forward power output from the power amplifier and a reflected power reflected from a load coupled thereto; and determining a present load impedance reflection coefficient based on the forward power and the reflected power; and adjusting a phase shifter coupled between the power amplifier and an antenna of the wireless mobile terminal responsive to the detected signal power, wherein adjusting the phase shifter comprises adjusting the phase shifter based on the present load impedance reflection coefficient.

28. The method of claim 27, wherein the phase shifter comprises a first phase shifter in a signal transmission path, the method further comprising:

determining a transmitter antenna port impedance based on the forward power and the reflected power;

determining a receiver antenna port impedance based on the transmitter antenna port impedance; and adjusting a second phase shifter in a signal reception path based on the receiver antenna port impedance.

* * * * *